(12) United States Patent
Li et al.

(10) Patent No.: US 12,379,064 B2
(45) Date of Patent: Aug. 5, 2025

(54) QUICK RELEASE DEVICE

(71) Applicant: Guangdong Sirui Optical Co., Ltd., Zhongshan (CN)

(72) Inventors: Jie Li, Guangdong (CN); Fan Xiao, Guangdong (CN)

(73) Assignee: Guangdong Sirui Optical Co., Ltd., Zhongshan (CN)

( * ) Notice: Subject to any disclaimer, the term of this patent is extended or adjusted under 35 U.S.C. 154(b) by 49 days.

(21) Appl. No.: 18/495,748

(22) Filed: Oct. 26, 2023

(65) Prior Publication Data
US 2024/0142044 A1 May 2, 2024

(30) Foreign Application Priority Data

Oct. 26, 2022 (CN) .......................... 202211322131.2
Oct. 26, 2022 (CN) .......................... 202222834108.3

(51) Int. Cl.
*F16M 11/14* (2006.01)
*G03B 17/56* (2021.01)

(52) U.S. Cl.
CPC ........... *F16M 11/14* (2013.01); *G03B 17/561* (2013.01); *F16M 2200/022* (2013.01)

(58) Field of Classification Search
CPC . F16M 11/14; F16M 2200/022; G03B 17/561
USPC .................................................. 248/122.1
See application file for complete search history.

(56) References Cited

U.S. PATENT DOCUMENTS

| | | | | |
|---|---|---|---|---|
| 2,670,228 A | * | 2/1954 | Pagliuso ................ | F16M 11/14 285/267 |
| 3,632,073 A | * | 1/1972 | Nakatani .............. | F16M 11/242 248/169 |
| 4,974,802 A | * | 12/1990 | Hendren ................ | F16M 11/14 403/90 |
| 10,845,679 B2 | * | 11/2020 | Zhu ........................ | F16M 11/08 |
| 11,085,576 B2 | * | 8/2021 | Li .......................... | F16M 11/16 |
| 2016/0040824 A1 | * | 2/2016 | Mayer ................... | F16C 11/103 348/373 |
| 2021/0190261 A1 | * | 6/2021 | Warner .................. | F16M 11/16 |

OTHER PUBLICATIONS

Japanese Office Action issued in JP2023003863 dated Nov. 21, 2023, 2 pages.

* cited by examiner

*Primary Examiner* — Anita M King
(74) *Attorney, Agent, or Firm* — Loeb & Loeb LLP

(57) ABSTRACT

A quick release device includes a tripod, a ball structure, a connecting screw securing to the ball structure, and a locking handle for locking and unlocking between the ball structure and the tripod. The locking handle includes a first cone locking handle, a screw structure with a second cone that is matched with the first cone locking handle. The screw structure includes a first screw and a second screw, where the first screw and the second screw are on opposite sides of the screw structure cooperating with each other to form a threaded hole structure. An outer wall of the screw structure is provided with an inclined chute, and the first cone locking handle is secured with a screw guide extending into the chute. The first cone locking handle is also connected to a pressing structure.

14 Claims, 7 Drawing Sheets

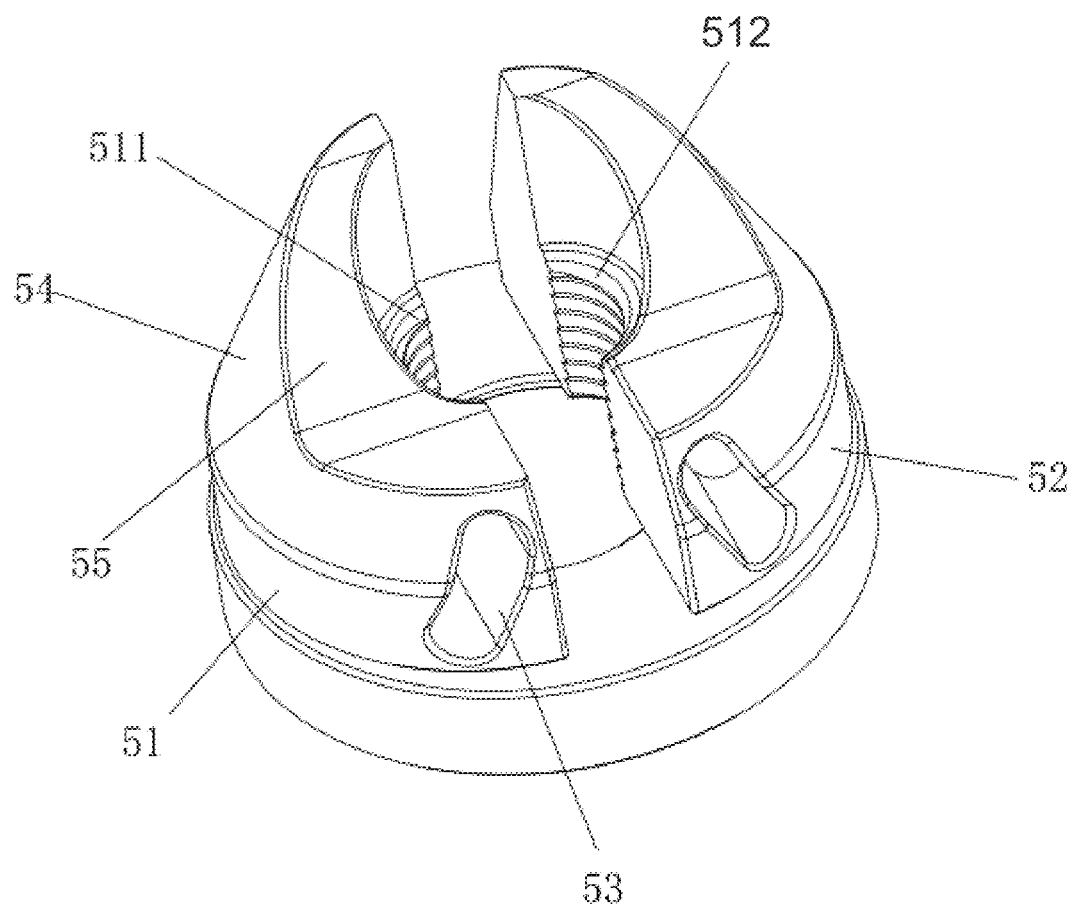

QUICK RELEASE DEVICE

CROSS-REFERENCE TO RELATED APPLICATIONS

This application claims priority to Chinese application numbers 202211322131.2 and 202222834108.3, filed on Oct. 26, 2022, whose disclosures are incorporated by reference in their entirety herein.

TECHNICAL FIELD

The present application relates to a technical field of photographic auxiliary equipment, specifically relates to a quick release device.

BACKGROUND

At present, when using a video camera or camera to shoot photographs, it is often necessary to fix it on the camera stand. The existing camera mount usually has a ball structure that can adjust the angle and direction of the camera, the ball structure is secured and connected with a screw, the screw is connected to the handle, and the handle is provided with a locking assembly. The locking assembly is used to lock the screw on the handle. When an angle of the bowl needs to be adjusted, the locking assembly may need to be released and turned the handle to adjust the angle of the bowl. Once the angle of the bowl is adjusted in place, the locking assembly can be screwed in place to arrange the bowl at the desired angle.

In the prior art, the locking assembly uses a knob with a threaded structure to lock the screw to secure the knob. The knob on the screw has a long working range and usually needs to turn the knob multiple times, so it takes a long time to achieve the locking of the bowl. As a result, sometimes it misses the best shooting time. Some other existing locking components that use the press-type structure to achieve screw locking. Although the locking operation time is relatively short, but the common pressing structure is not enough to lock the screw, and the bowl is prone to movements and affect the camera or camera shooting effect.

Therefore, it is necessary to design a quick release device with strong locking force and easy to quickly lock the screw.

SUMMARY

Embodiments of the invention may provide a quick release and assembly device with strong locking force that may achieve rapid screw locking.

In other aspects, to solve the above technical problems, embodiments of the invention may provide technical solutions as follows:

In some embodiments, a quick release device, which may include a tripod and a ball structure placed on the tripod. A connecting screw is secured to the ball structure, and a locking handle may lock and unlock between the ball structure and the tripod. Furthermore, in some embodiments, the locking handle may include:

In some embodiments, the locking handle may include a holding cavity, and a top thereof may include an opening hole for the connecting screw to extend into the holding cavity. The locking handle may include an inner wall that has a first cone.

In some embodiments, a screw block structure, placed in the holding cavity, may include an outer wall of which may include a second cone surface compatible with the first cone.

The screw block structure may include a first screw block and a second screw block. The first screw block may include a first thread structure on one side facing the second screw block. The second screw block may include a second thread structure on the side facing the first screw block. The first thread structure and the second thread structure cooperate with each other to form a threaded hole structure that is mated with the connecting screw. The first screw block and the second screw block may both be provided with at least one chute, and the extension direction of the chute is tilted relative to an axis direction of the threaded hole structure.

In some embodiments, a screw guide may be secured and connected to the locking handle and extended into the corresponding chute.

In some embodiments, a pressing structure, attached to the locking handle, may drive the screw structure to move in a direction away from the ball structure in the direction of the axis of the connecting screw and may make the first screw block and the second screw block move away from each other under the guiding action of the screw guide.

In some embodiments, an elastic member may be disposed on the side of the screw structure facing away from the ball structure, and its elastic force may drive the screw block structure to move in the direction close to the ball structure along the axial direction of the connecting screw.

Further, in some embodiments, the opposite two sides of the first screw block are provided with chutes, and the opposite sides of the second screw block are also provided with chutes, each of which corresponds to a guide member of the screw block.

Further, the two chutes on opposite sides of the first screw block may be dislocated or misaligned in a vertical direction of the first screw block, and the two chutes on opposite sides of the second screw block may be dislocated or misaligned in a vertical direction of the second screw block.

Further, in some embodiments, on the same side of the screw block structure, the chute on the first screw block and the chute on the second screw block may be symmetrically disposed along the opposite direction of the first screw block and the second screw block.

Further, in some embodiments, the locking handle may include a locking seat and a seat disposed above the locking seat with relative rotation. The holding cavity may be disposed in the locking seat, and the first cone may be disposed on the inner wall surface of the locking seat corresponding to the holding cavity. The seat may include a contact surface that is matched to the outer wall of the tripod to keep the seat and the tripod relatively stationary.

Further, in some embodiments, a bottom portion of the locking seat may be connected to a bottom cover. In one embodiment, the bottom portion of the screw block structure comprises a top block, and the elastic member elastically may be disposed between the bottom cover and the top block.

Further, in some embodiments, the first screw block may include a first bevel and the second screw block may include a second bevel. The first bevel on the first screw block and the second bevel on the second screw block may be on the same first oblique guide plane. In some embodiments, the pressing structure may include a button movably connected to the side wall of the locking handle, and a slider connected to one end of the button extending into the locking handle. In some embodiments, a second oblique guide surface may be in coordination with the first oblique guide surface, and the locking seat is connected with a limit block on the side of the slider facing back to the screw structure.

Further, in some embodiments, the limit block may be connected to a screw guide sleeve for the connecting screw to pass through, and the upper part of the limit member may include a bearing set on the outer circumference of the screw guide sleeve, and the seat is disposed above the limit block by relative rotation of the bearing.

Further, in some embodiments, the inner wall of the seat may include an extension wall sleeved around the outer circumference of the screw guide sleeve, and the bearing is located between the extension wall and the limit block. The outer wall of the screw guide sleeve may be secured connected to a limiting ring, and the limiting ring may be blocked on the side of the extension wall facing away from the bearing.

Further, in some embodiments, the inner wall of the tripod may include a first curvature, and the outer wall of the tripod may include a second curvature. In some embodiments, the first curvature and the second curvature are disposed in the same circle. In some embodiments, the outer wall of the ball structure may include a third curvature in coordination with the first curvature. In some embodiments, the ball structure may be disposed on the first curvature by the third curvature rotation. In another embodiment, the inner wall of the seat may include a fourth curvature in coordination with the second curvature, and the seat may be disposed on the second curvature by the fourth curvature rotation.

Moreover, some embodiments of the invention provide at least following technical solutions:

1. A quick release device provided by the present application, where the ball structure may be disposed on the tripod. In one aspect, the connecting screw on the ball structure may be inserted into the locking handle. An opening on the top of the connecting screw locking handle may extend into inside of the locking handle, the upper end of the locking handle may be positioned against the outer wall of the tripod, and the end of the connecting screw is pushed against the first screw and the second screw block to move downward, because the screw guide secured on the locking handle extends into the chute of the first screw and the second screw. In another example, when the first screw and the second screw move downward, the first screw and the second screw are separated from each other under the guidance action of the respective screw guide, at this time the connecting screw may be directly inserted between the first screw and the second screw. When the connecting screw stops inserting, the first screw and the second screw move upward under the action of the elastic part. Under the guidance of the screw guide close to each other, at this time, the first thread structure on the first screw block and the second thread structure on the second screw block cooperate with each other to form a threaded hole structure that is mated with the connecting screw. The overall thread of the screw structure may be connected to the connecting screw, at this time turn in one direction to tighten the locking handle a circle, the locking handle drives the first screw and the second screw block to rotate synchronously with the locking handle through the screw guide, the screw structure as a whole relative to the connecting screw upward movement, due to the cooperation of the first cone surface of the inner wall of the locking handle and the second cone of the outer wall of the screw structure, the locking force between the screw structure and the locking handle will become larger and larger when moving upward.

The larger the locking force between the corresponding screw structure and the connecting screw, the greater the locking effect. When it is necessary to remove the locking handle, first turn the locking handle in the opposite direction for a circle, and then press the pressing structure, press the structure to drive the overall downward movement of the screw structure, and at the same time that the screw structure moves downward as a whole, the first screw and the second screw block are separated from each other under the guidance of the respective screw guide parts, so as to release the locking of the connecting screw, at this time the quick locking assembly can be quickly removed. This quick release device, through the combination of pressing structure and screw structure to achieve the locking and unlocking of the connecting screw, compared with the use of knobs with a threaded structure in the prior art to lock the connecting screw, when locking, only need to rotate the locking handle less turns to achieve the locking screw and ball structure locking, in the disassembly, only need to rotate the locking handle less turns and press the pressing structure, the operation time is shorter, can avoid missing the best shooting time; compared with the existing technology using the compression structure to lock the connecting screw, and greatly enhance the locking force, avoiding the problem that the ball structure is easy to shake due to insufficient locking force, which affects the camera or camera shooting effect.

2. In the quick release device provided by the present application, the opposite sides of the first screw block and the second screw block may be provided with chutes, and each chute may correspond to the way of setting a screw guide, the guiding reliability may be higher, and the position shift of the first screw and the second screw block can be prevented.

3. In the quick release device provided by the present application, the two chutes on both sides of the first screw block and the second screw block may be arranged in the height direction, which can also improve the guiding effect of the screw guide through the chute to the direction of movement of the screw structure.

4. In the quick release device provided by the application, the locking handle may include a locking seat and a seat, the seat may have a contact surface that matches the outer wall of the tripod, when the locking seat is locked by the screw structure, the contact surface on the seat and the outer wall surface of the tripod may remain relatively static, and the seat may be locked on the tripod, so as to realize the locking of the ball structure on the tripod; when the locking seat loosens the connecting screw, the tripod can be rotated relative to the tripod and the installation angle of the bowl relative to the tripod can be adjusted.

5. In the quick release device provided by the present application, the setting of the top block between the screw structure and the elastic part, can maintain the smooth contact between the screw structure and the top block, and prevent the direct contact between the elastic part and the screw structure, causing the first screw block and the second screw block to be affected by the elastic part elastic force of different sizes.

6. In the quick release device provided by the present application, the pressing structure can be converted into the vertical movement of the screw structure by means of a slider with a second oblique guide surface and a screw structure bevel with a first oblique guide surface, which has the advantages of simple structure and easy operation.

An aspect provides a quick release device comprising: a tripod; a ball structure placed on the tripod; a connecting screw secured on the ball structure, and a locking handle for realizing locking and unlocking between the ball structure and the tripod, wherein the locking handle comprising: a locking handle having an interior with a holding cavity and an inner wall, and a top having an opening for the connecting screw to extend into the holding cavity; wherein the inner wall of the locking handle comprises a first cone; a screw block structure is disposed in the holding cavity and comprises a second cone that is compatible with the first cone; wherein the screw block structure comprises a first screw block and a second screw block, wherein the first screw block comprises a first thread structure on one side facing the second screw block, wherein the second screw block comprises a second thread structure on the side facing the first screw block, wherein the first thread structure and the second thread structure cooperate with each other to form a threaded hole structure that is mated with threads of the connecting screw; wherein the first screw block and the second screw block comprise at least one chute, and an extension direction of the chute is tilted relative to an axis direction of the threaded hole structure; a screw guide, secured and connected to the locking handle and extended into the at least one chute; a pressing structure, attached to the locking handle, for driving the screw structure to move in a direction of an axis of the connecting screw away from the ball structure and to move the first screw block and the second screw block away from each other due to the screw guide; and an elastic member is disposed on one side of the screw block structure facing away from the ball structure, wherein an elastic force thereof drives the screw block structure to move along the axial direction of the connecting screw in the direction close to the ball structure.

The at least one chute may be disposed in the first screw block and the at least one chute is disposed in the second screw block, and wherein the at least one chute accommodates the screw guide.

Two openings of the at least one chute disposed in the first screw block may be dislocated in a vertical direction of the first screw block, and two openings of the at least one chute disposed in the second screw block may be dislocated in a vertical direction of the second screw block.

The at least one chute on the first screw block and the at least one chute on the second screw block may be symmetrically disposed on the screw block structure.

The locking handle may comprise a locking seat and a seat disposed above the locking seat, wherein the holding cavity is located in the locking seat, the first cone is disposed on the inner wall corresponding to the holding cavity, and the seat has a matching outer wall of the tripod to make the seat and the tripod maintains a relatively stationary contact surface.

A bottom portion of the locking seat may be connected to a bottom cover, wherein the screw block structure may comprise a top block, and the elastic member may be disposed between the bottom cover and the top block.

The first screw block may comprise a first bevel and the second screw block may comprise a second bevel, and the first bevel and the second bevel may be on a first oblique guide plane.

The limit block may be connected to a screw guide sleeve, and an upper part of the limit block may comprise a bearing disposed on an outer circumference of the screw guide sleeve, and the seat may be movable by a relative rotation of the bearing toward the limit block.

The seat may comprise an extension wall set around the outer circumference of the screw guide sleeve, wherein the bearing may be located between the extension wall and the limit block; the outer circumference of the screw guide sleeve may be connected to a limiting ring, and the limiting ring may be limited by the extension wall facing away from the bearing.

The tripod may comprise an inner wall and an outer wall, wherein the inner wall may comprise a first curvature and the outer wall may comprise a second curvature, the first curvature and the second curvature may be centrally disposed, wherein the outer wall of the ball structure may comprise a third curvature matching the first curvature, and the ball structure may be configured to abut the first curvature via the third curvature, and the seat may comprises a fourth curvature matching the second curvature, and the seat may be configured to rotate about the fourth curvature via the second curvature.

The pressing structure may comprise a button movably connected to a side wall of the locking handle, wherein the button may extend into the locking handle.

The pressing structure may comprise a slide having a second oblique guide mated with the first oblique guide surface, wherein the locking seat may be connected to a limit block on one side of the slide opposite to the screw structure.

BRIEF DESCRIPTION OF DRAWINGS

In order to more clearly illustrate the specific embodiments of the present application or the technical solution in the prior art, the following will be a brief introduction to the drawings required in the specific embodiment or prior art description, obviously, the drawings described below are some embodiments of the present application, for those skilled in the art, without the premise of creative labor, may also obtain other drawings according to these drawings. Embodiments are now described, by way of example only, with reference to the accompanying drawings, in which:

FIG. 7 is a schematic diagram of the structure of the first screw block and the second screw block when the embodiment of the present application is far away from each other.

Figure 1:
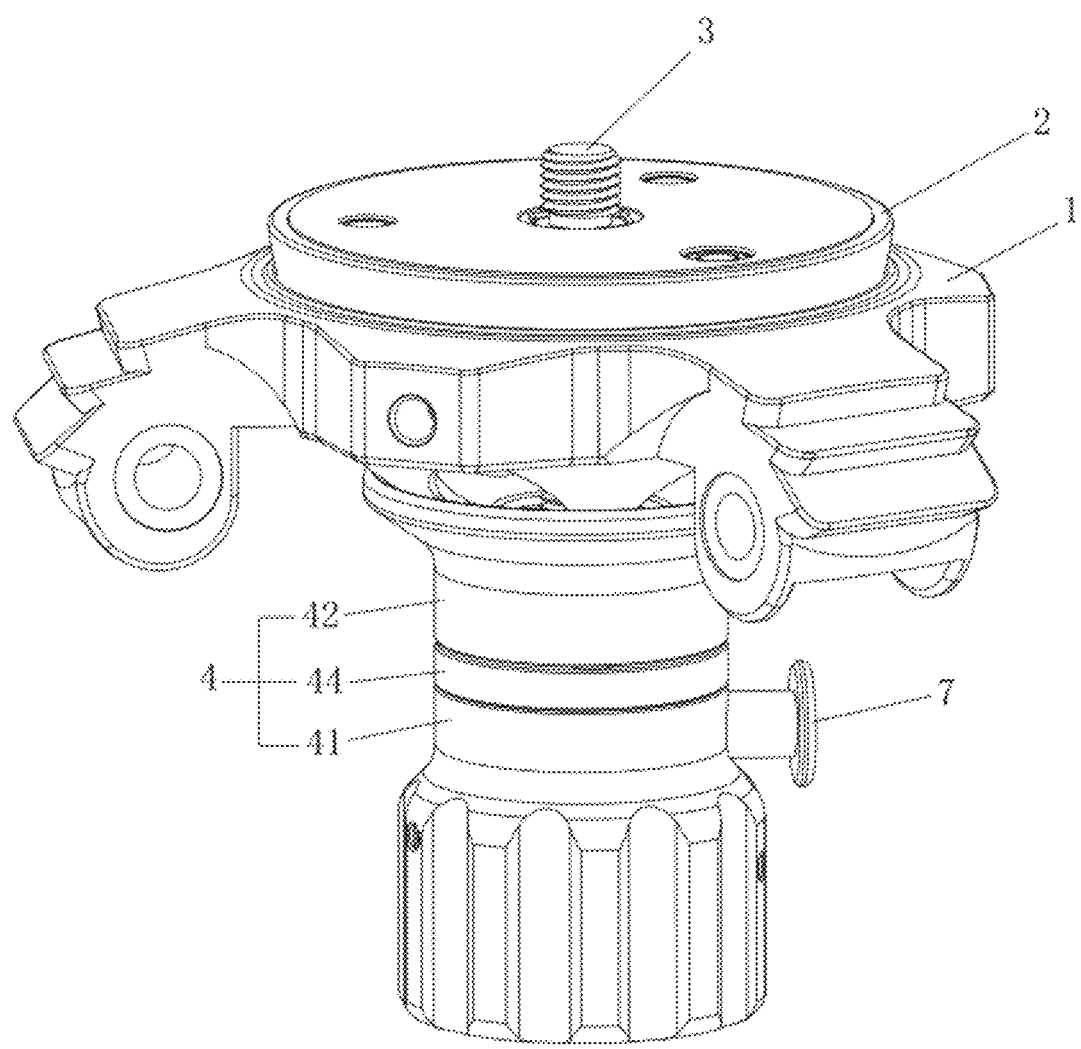
FIG. 1 is a schematic diagram of the overall structure of the quick release and assembly device provided by an embodiment of the present application.

Description of the drawings: 1, tripod; 101, first curvature; 102, second curvature; 2, ball structure; 201, third curvature; 3, connecting screw; 4, locking handle; 41, locking seat; 411, first cone; 42, seat; 420, fourth curvature; 421, extension wall; 43. bottom cover; 44. limit block; 45. screw guide sleeve; 46. bearing; 47. limiting ring; 5. screw structure; 51. first screw; 52. second screw; 511. First thread structure; 512, second thread structure; 53. chute; 54. Second cone; 55. First oblique guide surface; 6. Screw guide; 7. Press structure; 71. Button; 72. Slider; 8. Elastic part; 9. Top block.

DETAILED DESCRIPTION

The technical solution of the aspects of the invention will be clearly and completely described below in conjunction with the accompanying drawings. Obviously, the described embodiments are some embodiments of the present application, not all embodiments. Based on the embodiments in the present application, all other embodiments obtained by those of ordinary skill in the art without performing creative labor fall within the scope of protection of the present application.

In the description of the present application, it should be noted that the orientation or position relationship indicated by the terms "center", "up", "down", "left", "right", "vertical", "horizontal", "inside", "outside" and so on is based on the orientation or position relationship shown in the drawings, only to facilitate the description of the present application and simplify the description, not to indicate or imply that the device or element referred to must have a specific orientation, constructed and operated in a specific orientation, so it cannot be understood as a limitation of the present application. In addition, the terms "first", "second", "third" are for descriptive purposes only and cannot be understood as indicating or implying relative importance.

In the description of the present application, it should be noted that, unless otherwise expressly provided and qualified, the terms "installation", "connection", "connection" should be understood in a broad sense, for example, may be secured connection, may be detachable connection, or integrated connection; may be mechanical connection, or electrical connection; may be directly connected, or indirectly connected through an intermediate medium, may be internal connection of two elements. For those of ordinary skill in the art, the specific meaning of the above terms in the present application may be understood in a case-by-case situation.

Further, the technical features involved in different embodiments of the present application described below may be combined with each other as long as they do not constitute a conflict with each other.

Figure 2:
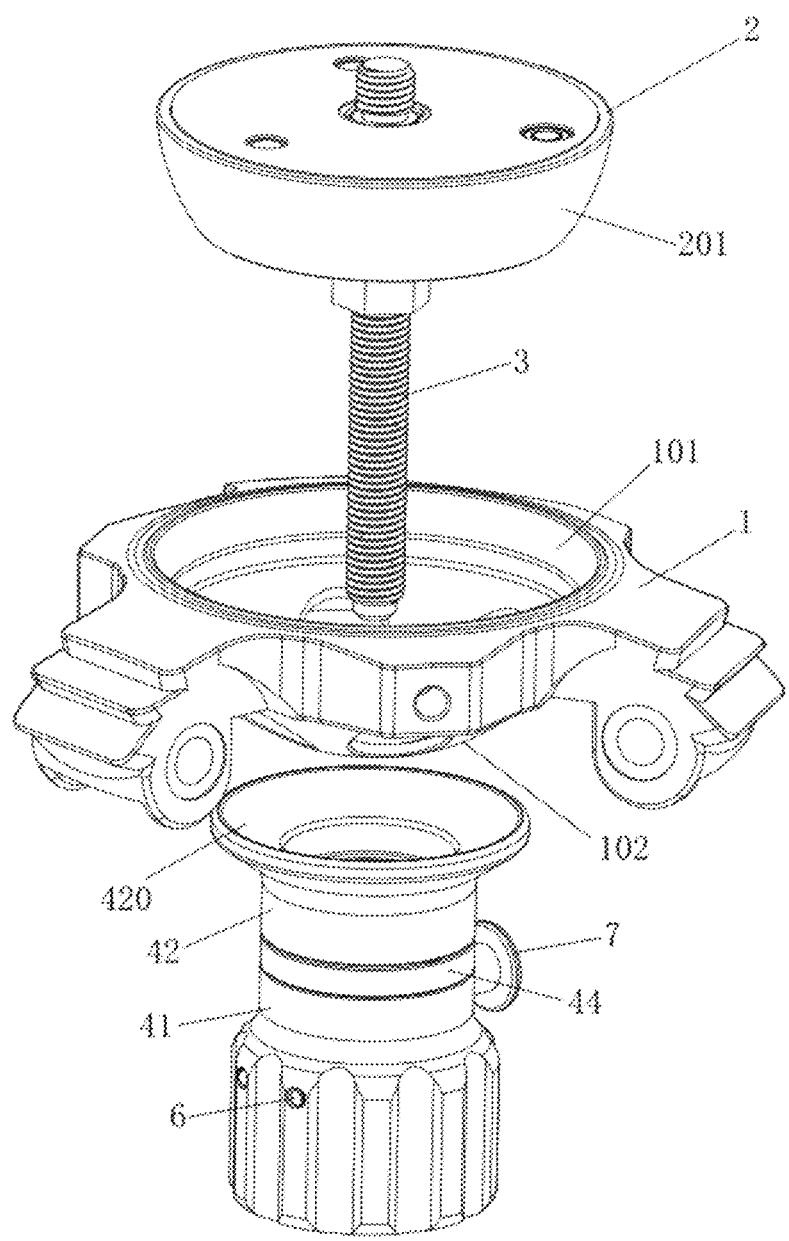
FIG. 2 is an explosive view of a quick release device provided by an embodiment of the present application.
Figure 3:
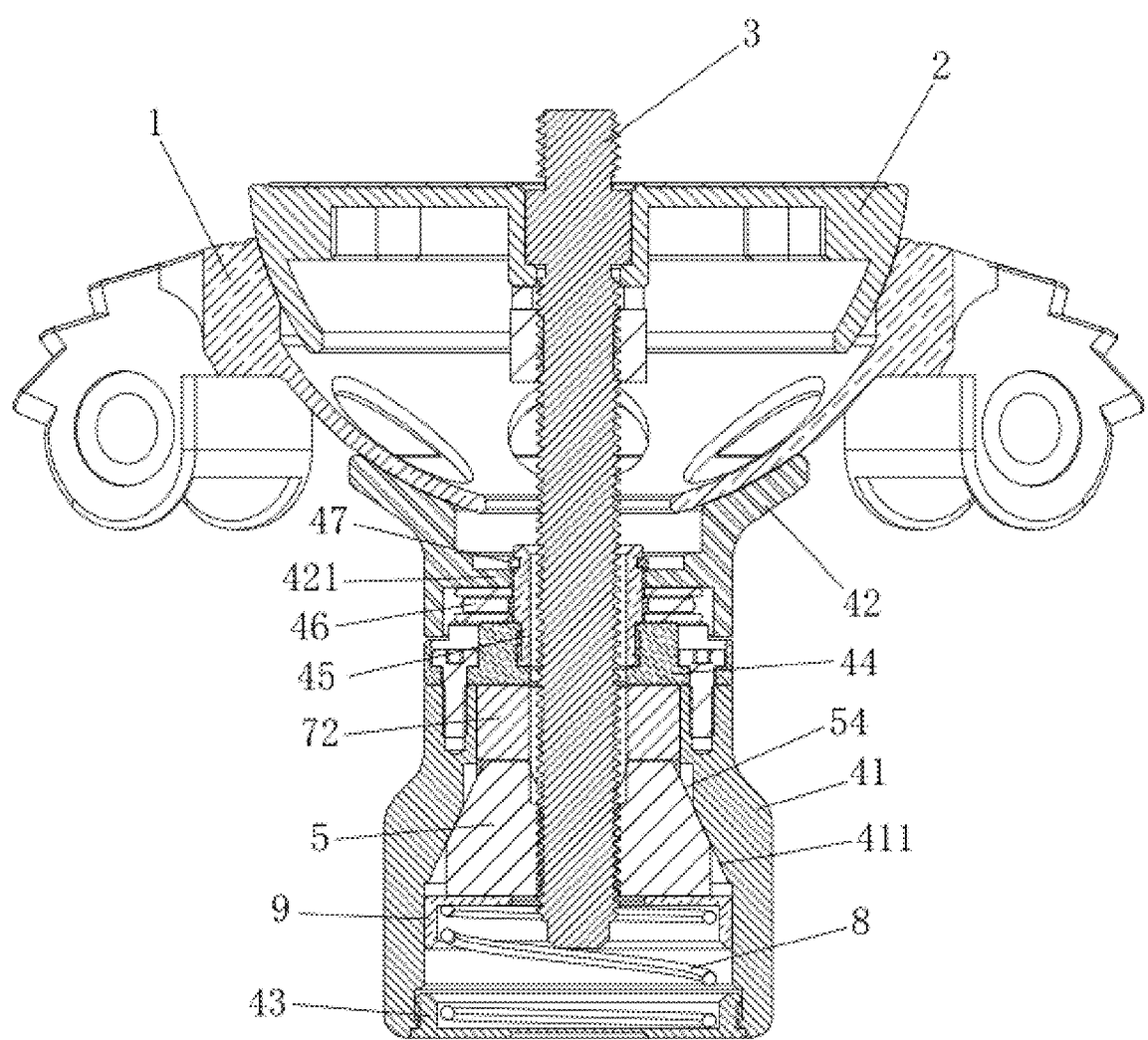
FIG. 3 is a cross-sectional view of the first side of the quick release device in an embodiment of the present application.
Figure 4:
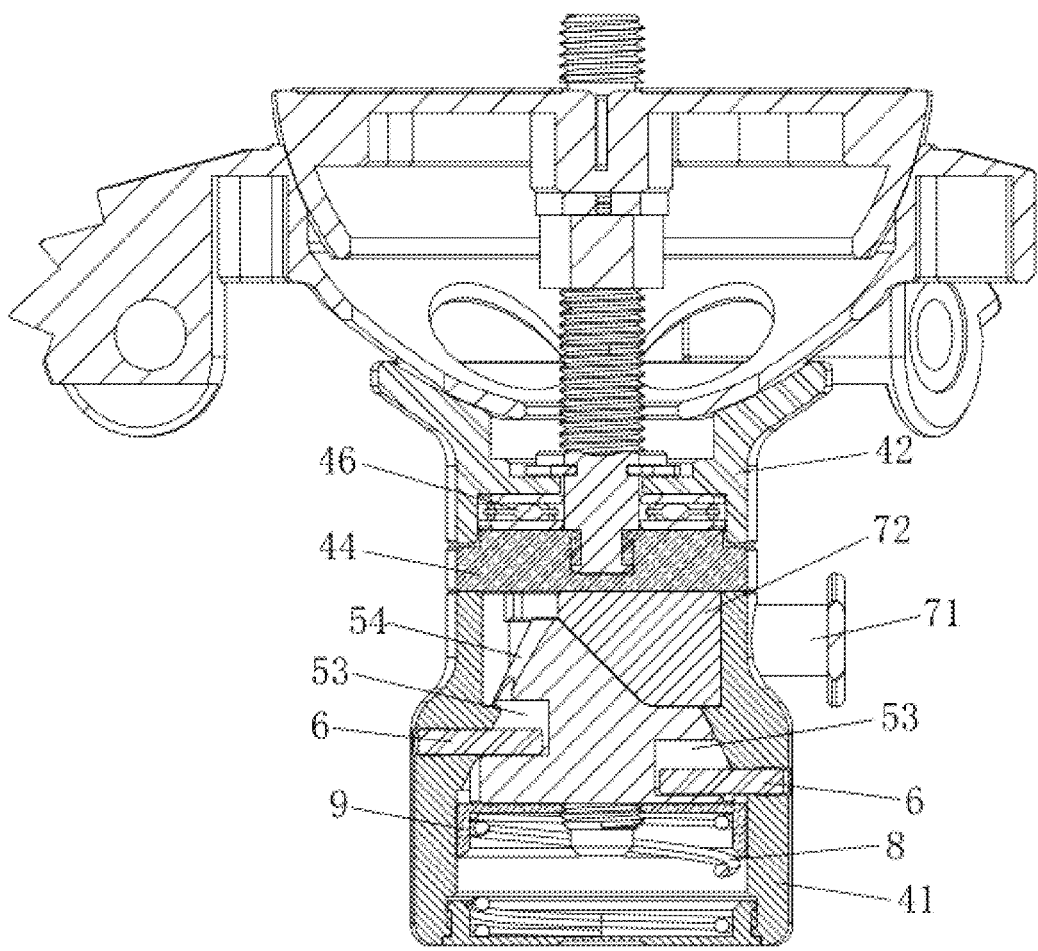
FIG. 4 is a cross-sectional view of the second side of the quick release device in an embodiment of the present application.
Figure 5:
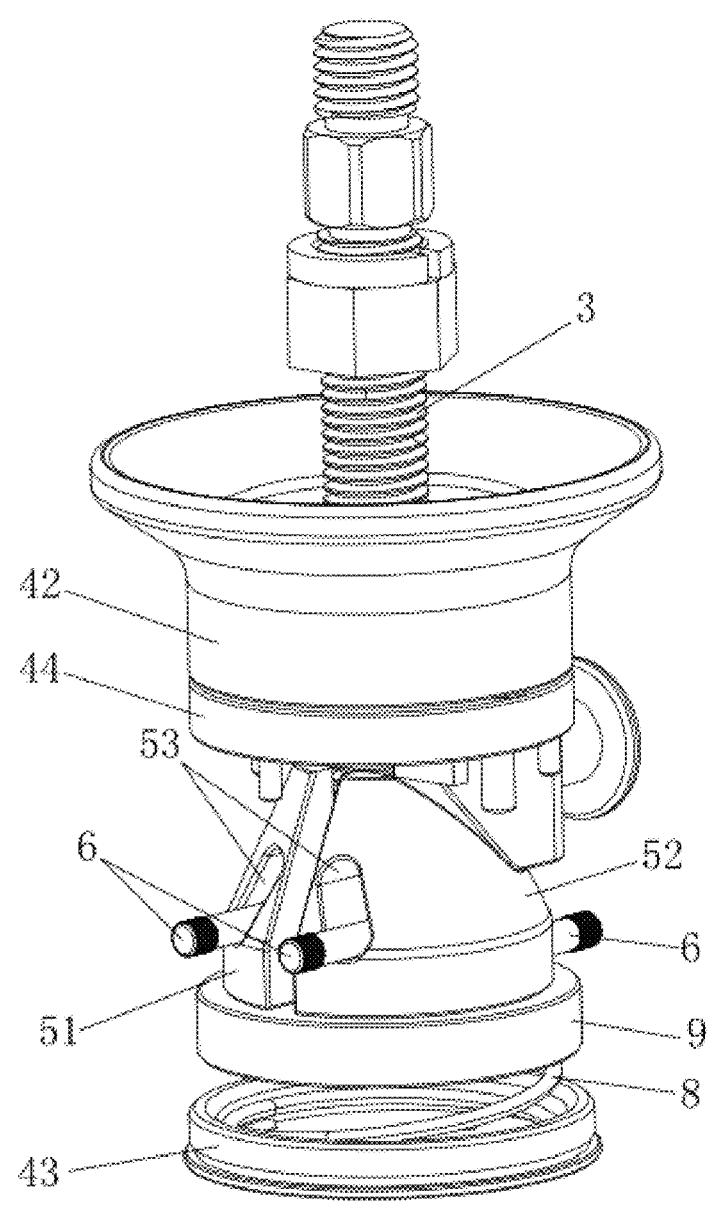
FIG. 5 is a schematic diagram of the structure of the quick release device behind the hidden locking seat in the embodiment of the present application.
Figure 6:
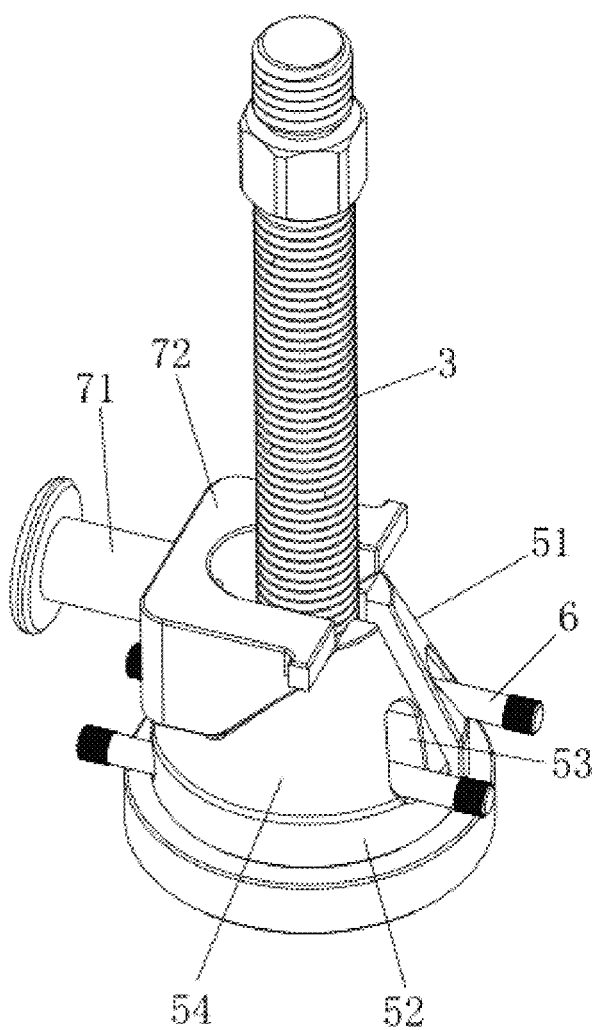
FIG. 6 is a schematic diagram of the connection relationship between the connecting screw, the screw block structure and the pressing structure in the embodiment of the present application.

A quick release device as shown in FIG. 1-7, including a tripod 1, a ball structure 2, a connecting screw 3 and a locking handle.

In the present and some other embodiments, the outer circumference of the tripod 1 may include a seat. The seat may include an opening to connect with the support feet of the tripod, which may be hinged and installed about the seat. In one aspect, the seat may also include a plurality of limit tooth positions, and the plurality of limit tooth positions may be used to cooperate with the support feet to maintain a limited opening angle. The inner wall of tripod 1 may include a first curvature 101, and the outer wall of tripod 1 may include a second curvature 102. The first curvature 101 and the second curvature 102 may include concentric settings. It should be noted here that neither the first curvature 101 nor the second curvature 102 may need to be complete spheres, but only part of the complete spheres.

In the present and some other embodiments, the ball structure 2 may be disposed on a tripod 1, the outer wall of the ball structure 2 may include a third curvature 201 coordinated with the first curvature 101. In one aspect, the radius of the third curvature 201 and the radius of the first curvature 101 may be of the same size. The ball structure 2 may rotate freely within the first curvature 101 through the cooperation of the third curvature 201 and the first curvature 101. It is understood here that the third curvature 201 may not be a complete sphere, but only a part of the complete sphere. The mid-securing connection or the middle section of the ball structure 2 may be connected to the connecting screw 3, and one end of the connecting screw 3 is passing or pierced from the upper end face of the ball structure 2, and the other end is passing or pierced from the lower end face of the ball structure 2. The quick-release handle is threaded to the connecting screw 3 of the lower end part of the ball structure 2 to realize the locking and unlocking between the ball structure 2 and the tripod 1.

In the present and some other embodiments, the locking handle may include a locking handle 4, a screw structure 5, a screw guide 6, a pressing structure 7 and an elastic member 8. Wherein the inside of the locking handle 4 may include a holding cavity, the top of the locking handle 4 may include an opening hole for the connecting screw 3 to extend into the holding cavity. The inner wall of the locking handle 4 may include a first cone 411, and the first cone 411 may be a cone structure with a large opening at the lower end and a small opening at the upper end. In one example, the screw structure 5 may be disposed in the holding cavity, and the outer wall of the screw structure 5 may include a second cone 54 in conjunction with the first cone 411. In one example, the screw structure 5 may include a first screw 51 and a second screw 52. The first screw block 51 may include a first thread structure 511 on the side facing the second screw block 52, and the second screw block 52 may include a second thread structure 512 on the side facing the first screw block 51. The first thread structure 511 and the second thread structure 512 may cooperate with each other to form a threaded hole structure that is mated with the connecting screw 3 threads.

The outer wall of the first screw block 51 and the second screw block 52 may include at least one chute 53, where the extension direction of chute 53 is tilted relative to the axis direction of the threaded hole structure. One end of the screw guide 6 may be secured and connected to the locking handle 4, and the other end extends into the corresponding chute 53. The pressing structure 7 is movably connected to the side wall of the locking handle 4, and the pressing structure 7 may be used to drive the screw structure 5 along the axis direction of the connecting screw 3 away from the ball structure 2 and to move the first screw 51 and the second screw block 52 away from each other under the guidance action of the screw guide 6. The elastic member 8 may be elastically disposed on the side of the screw structure 5 facing away from the ball structure 2, and the elastic force of the elastic member 8 drives the screw structure 5 to move in the axial direction connecting the screw 3 in the direction close to the ball structure 2.

When this quick release device is used, the ball structure 2 may be disposed on the tripod 1, when the connecting screw 3 on the ball structure 2 is inserted into the locking handle, the opening at the top of the connecting screw 3 may extend into the inside of the locking handle 4. The upper end of the locking handle 4 is abut against the outer wall of the tripod 1, and the end of the connecting screw 3 may abut against the first screw block 51 and the second screw block 52 and may move down because the screw guide 6 secured on the locking handle 4 may extend into the chute 53 of the first screw block 51 and the second screw block 52. When the first screw block 51 and the second screw block 52 move down, the first screw block 51 and the second screw block 52 are separated from each other under the guidance action of the respective screw guide 6. At this time the connecting screw 3 may be directly inserted between the first screw and the second screw. When the connecting screw 3 stops inserting, the first screw 51 and the second screw 52 may move upward under the action of the elastic member 8 and under the guidance action of the screw guide 6 close to each other. At this time the first thread structure 511 on the first screw block 511 and the second thread structure 512 on the second screw block 52 cooperate with each other to form a threaded hole structure that is mated with the connecting screw 3 thread, the screw structure 5 is connected to the connecting screw 3. At this time, the user could then rotate or turn the tightening lock handle 4 in one direction in a circle, the locking handle 4 drives the first screw 51 and the second screw block 52 to rotate synchronously with the locking handle 4 through the screw guide 6, and the screw structure 5 is overall relative to the connection screw 3 upward movement.

Due to the matching effect of the first cone 411 of the inner wall of the locking handle 4 and the second cone 54 of the outer wall of the screw structure 5, the locking force between the screw structure 5 and the locking handle 4 may increase when moving upward, and the locking force between the corresponding screw structure 5 and the connecting screw 3 is also greater, which greatly enhances the locking effect. When it is necessary to remove the locking handle, the user may first rotate or turn the locking handle 4 in the opposite direction, and then press the structure 7 to drive the screw structure 5 to move down as a whole, and the screw structure 5 to move down as a whole, the first screw 51 and the second screw 52 are separated from each other under the guidance action of the respective screw guide 6, thereby releasing the lock of the connecting screw 3, at which time the quick locking assembly can be quickly removed. This quick release device, by pressing the structure 7 and screw structure 5 combined with each other to achieve the locking and unlocking of the connecting screw 3, compared with the use of knobs with a threaded structure in the prior art to lock the connecting screw 3, when locking, only need to turn the locking handle 4 to achieve the locking screw 3 and ball structure 2 locking. In releasing it, only need to rotate the locking handle 4 less turns and press the pressing structure 7, the operation time is shorter, can avoid missing the best shooting time; compared with the previous technology using the compression structure to lock the connecting screw 3, and greatly enhance the locking force, avoiding the problem that the ball structure 2 is easy to shake due to insufficient locking force and affect the camera or the camera shooting effect.

In some embodiments, the locking handle 4 includes a locking seat 41 and a seat 42 with relative rotation disposed above the locking seat 41, the holding cavity is located in the locking seat 41, the first cone 411 is disposed on the inner wall surface of the locking seat 41 corresponding to the holding cavity, the fourth curvature 420 is disposed at the upper end of the seat 42, and the seat 42 is matched with the outer wall of the tripod 1 through the fourth curvature 420 so that the seat 42 and the tripod 1 remain relatively stationary. When the locking seat 41 is locked by the screw structure 5, the connecting screw 3 is locked, the fourth curvature 420 on the seat 42 and the second curvature 102 of the tripod 1 remain relatively stationary, and the seat 42 is locked on the tripod 1, thereby realizing the locking of the ball structure 2 on the tripod 1; when the locking seat 41 loosens the connecting screw 3, the tripod 1 may be rotated relative to the tripod 1, and the installation angle of the bowl 2 relative to the tripod 1 may be adjusted.

In some embodiments, the opposite sides of the first screw block 51 are provided with chutes 53, the opposite sides of the second screw block 52 are also provided with chutes 53, chutes 53 is a blind hole structure with an opening at only one end; the screw guide 6 has four, each chute 53 corresponds to a screw guide 6, the axial direction of the four screw guide 6 is parallel to each other; one end of the screw guide 6 is threaded and connected to the locking seat 41. Specifically, on the same side of the screw structure 5, the chute 53 on the first screw block 51 and the chute 53 on the second screw block 52 are symmetrically disposed along the opposite wiring direction of the first screw block 51 and the second screw block 52. The first screw block 51 and the second screw block 52 are provided with chute 53 on both opposite sides, and each chute 53 corresponds to a screw guide 6, the guiding reliability is higher, and the position offset of the first screw block 51 and the second screw block 52 can be prevented. In some other embodiments of the present embodiment, the chute 53 may also have an open through-hole structure at both ends, and the two ends of the screw guide 6 are secured to the side wall of the locking seat 41.

In some embodiments, the two chutes 53 on both sides of the first screw block 51 are misplaced in the height direction of the first screw block 51, and the two chutes 53 on opposite sides of the second screw block 52 are misplaced in the height direction of the second screw block 52. This setting can improve the guiding effect of the screw guide 6 through the chute 53 to the direction of movement of the screw structure 5.

In the present and some other embodiments, the bottom of the locking seat 41 is connected with a bottom cover 43, the lower part of the screw structure 5 is provided with a top block 9, and the elastic member 8 is elastically disposed between the bottom cover 43 and the top block 9. The setting of the top block 9 may maintain a smooth contact between the screw structure 5 and the top block 9 and prevent the direct contact between the elastic part 8 and the screw structure 5 causing the first screw 51 and the second screw 52 to be affected by the elastic part 8 elastic force problems.

In the present and some other embodiments, the first screw block 51 and the second screw block 52 are provided with bevels above, and the bevel on the first screw block 51 and the bevel on the second screw block 52 are on the same first oblique guide plane 55. The pressing structure 7 includes a button 71 movably connected to the side wall of the locking seat 41, and a slider 72 secured to one end of the button 71 reaching into the locking handle 4 and having a second oblique guide 721 mated with the first oblique guide 55; the locking seat 41 is secured by screws connected to one side of the slide 72 back screw structure 5 limit block 44. When the button 71 pushes the slide 72 to move, the limit block 44 may prevent the slide 72 from moving upward, so that the slider 72 drives the screw structure 5 downward movement through the bevel action.

In the present and some other embodiments, the limit block 44 is connected to a screw guide sleeve 45 for connecting screw 3 through, and the bearing 46 is provided above the limit member set around the outer circumference of the screw guide sleeve 45, and the seat 42 is provided above the limit block 44 by relative rotation of the bearing 46. The inner wall of the seat 42 is provided with an extension wall 421 sleeved around the outer circumference of the screw guide sleeve 45, the bearing 46 is located between the extension wall 421 and the limit block 44; the outer wall of the screw guide sleeve 45 is secured connected to the limiting ring 47, and the limiting ring 47 is blocked on one side of the extension wall 421 facing back bearing 46.

In summary, the quick release device provided by some embodiments of the present application, the ball structure 2 is disposed on the tripod 1, the locking handle can be directly inserted into the connecting screw 3 of the ball structure 2, clockwise or counterclockwise rotation (according to the screw rotation direction of the first thread structure 511 and the second thread structure 512) locking handle once turn, a user may lock the ball structure 2 and the tripod 1; when loosening, only need to turn the tripod 1 around, press the unlock button 71, the user may then pull out the locking handle, at this time the ball structure 2 may be separated from the tripod 1. With a strong locking force when locked, the advantages of a brief amount of time needed for locking and unlocking operations can greatly improve the user experience.

Obviously, the above embodiments are only examples for clarity, and do not qualify the embodiment. For ordinary people skilled in the art, other different forms of change or change can be made on the basis of the above description. There is no need and cannot be exhaustive of all implementations. The apparent change or variation derived therefrom remains within the scope of protection created by the present application.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure.

Although certain example embodiments of the invention have been described, the scope of the appended claims is not intended to be limited solely to these embodiments. The claims are to be construed literally, purposively, and/or to encompass equivalents.

The invention claimed is:

1. A quick release device comprising:
a tripod (1);
a ball structure (2) placed on the tripod (1);
a connecting screw (3) secured on the ball structure (2), and
a locking handle for realizing locking and unlocking between the ball structure (2) and the tripod (1), wherein the locking handle comprises:
an interior with a holding cavity and an inner wall, and a top having an opening for the connecting screw (3) to extend into the holding cavity;
wherein the inner wall of the locking handle (4) comprises a first cone (411);
a screw block structure (5) is disposed in the holding cavity and comprises a second cone (54) that is compatible with the first cone (411);
wherein the screw block structure (5) comprises a first screw block (51) and a second screw block (52), wherein the first screw block (51) comprises a first thread structure (511) on one side facing the second screw block (52), wherein the second screw block (52) comprises a second thread structure (512) on the side facing the first screw block (51), wherein the first thread structure (511) and the second thread structure (512) cooperate with each other to form a threaded hole structure that is mated with threads of the connecting screw (3);
wherein the first screw block (51) and the second screw block (52) comprise at least one chute (53), and an extension direction of the chute (53) is tilted relative to an axis direction of the threaded hole structure;
a screw guide (6), secured and connected to the locking handle (4) and extended into the at least one chute (53);
a pressing structure (7), attached to the locking handle (4), for driving the screw structure (5) to move in a direction of an axis of the connecting screw (3) away from the ball structure (2) and to move the first screw block (51) and the second screw block (52) away from each other due to the screw guide (6); and
an elastic member (8) is disposed on one side of the screw block structure (5) facing away from the ball structure (2), wherein an elastic force thereof drives the screw block structure (5) to move along the axial direction of the connecting screw (3) in the direction close to the ball structure (2).

2. The quick release device according to claim 1, wherein the at least one chute (53) is disposed in the first screw block (51) and the at least one chute (53) is disposed in the second screw block (52), and wherein the at least one chute (53) accommodates the screw guide (6).

3. The quick release device according to claim 2, wherein two openings of the at least one chute (53) disposed in the first screw block (51) are dislocated in a vertical direction of the first screw block (51), and two openings of the at least one chute (53) disposed in the second screw block (52) are dislocated in a vertical direction of the second screw block (52).

4. The quick release device according to claim 2, wherein the at least one chute (53) on the first screw block (51) and the at least one chute (53) on the second screw block (52) are symmetrically disposed on the screw block structure (5).

5. The quick release device according to claim 1, wherein the locking handle (4) comprises a locking seat (41) and a seat (42) disposed above the locking seat (41), wherein the holding cavity is located in the locking seat (41), the first cone (411) is disposed on the inner wall corresponding to the holding cavity, and the seat (42) has a matching outer wall of the tripod (1) to make the seat (42) and the tripod (1) maintains a relatively stationary contact surface.

6. The quick release device according to claim 5, wherein a bottom portion of the locking seat (41) is connected to a bottom cover (43), wherein the screw block structure (5) comprises a top block (9), and the elastic member (8) is disposed between the bottom cover (43) and the top block (9).

7. The quick release device according to claim 5, wherein the first screw block (51) comprises a first bevel and the second screw block (52) comprises a second bevel, and the first bevel and the second bevel are on a first oblique guide plane (55).

8. The quick release device according to claim 7, wherein the limit block (44) is connected to a screw guide sleeve (45), and an upper part of the limit block (44) comprises a bearing (46) disposed on an outer circumference of the screw guide sleeve (45), and the seat (42) is movable by a relative rotation of the bearing (46) toward the limit block (44).

9. The quick release device according to claim 8, wherein the seat (42) comprises an extension wall (421) set around the outer circumference of the screw guide sleeve (45), wherein the bearing (46) is located between the extension wall (421) and the limit block (44); the outer circumference of the screw guide sleeve (45) is connected to a limiting ring (47), and the limiting ring (47) is limited by the extension wall (421) facing away from the bearing (46).

10. The quick release device according to claim 5, wherein the tripod (1) comprise an inner wall and an outer wall, wherein the inner wall comprises a first curvature (101) and the outer wall comprises a second curvature (102), the first curvature (101) and the second curvature (102) are centrally disposed, wherein the outer wall of the ball structure (2) comprises a third curvature (201) matching the first curvature (101), and the ball structure (2) is configured to abut the first curvature (101) via the third curvature (201), and the seat (42) comprises a fourth curvature (420) matching the second curvature (102), and the seat (42) is configured to rotate about the fourth curvature (420) via the second curvature (102).

11. The quick release device according to claim 1, wherein the pressing structure (7) comprises a button (71) movably connected to a side wall of the locking handle (4), wherein the button (71) extends into the locking handle (4).

12. The quick release device according to claim 5, wherein the pressing structure (7) comprises a slide (72) having a second oblique guide (721) mated with the first oblique guide surface (55), wherein the locking seat (41) is connected to a limit block (44) on one side of the slide (72) opposite to the screw structure (5).

13. The quick release device according to claim 3, wherein the at least one chute (53) on the first screw block (51) and the at least one chute (53) on the second screw block (52) are symmetrically disposed on the screw block structure (5).

14. The quick release device according to claim 6, wherein the first screw block (51) comprises a first bevel and the second screw block (52) comprises a second bevel, and the first bevel and the second bevel are on a first oblique guide plane (55).

* * * * *